July 1, 1941. W. A. GINDELE 2,247,368
BRAKE CONTROL FOR AUTOMOTIVE VEHICLES
Filed June 19, 1940 2 Sheets-Sheet 1
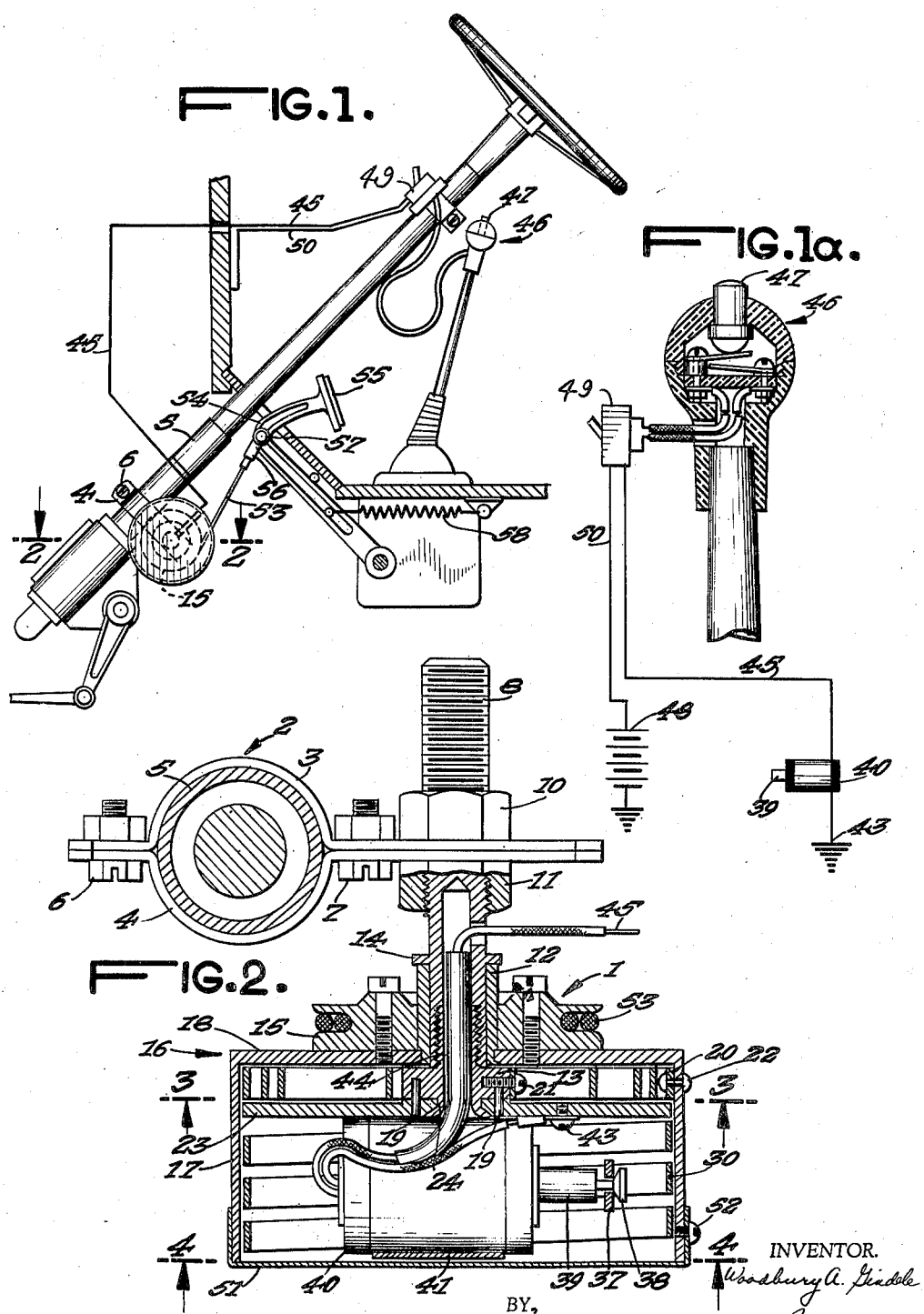
INVENTOR.
Woodbury A. Gindele
BY,
Louis Burgess
ATTORNEY, July 1, 1941.     W. A. GINDELE     2,247,368
BRAKE CONTROL FOR AUTOMOTIVE VEHICLES
Filed June 19, 1940     2 Sheets-Sheet 2
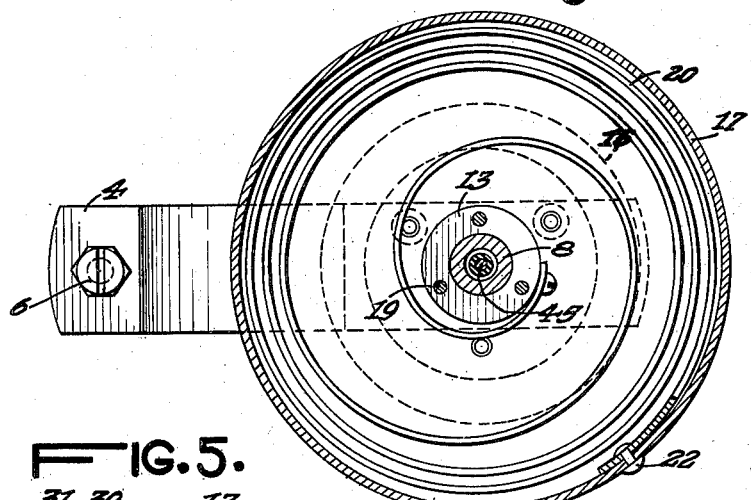
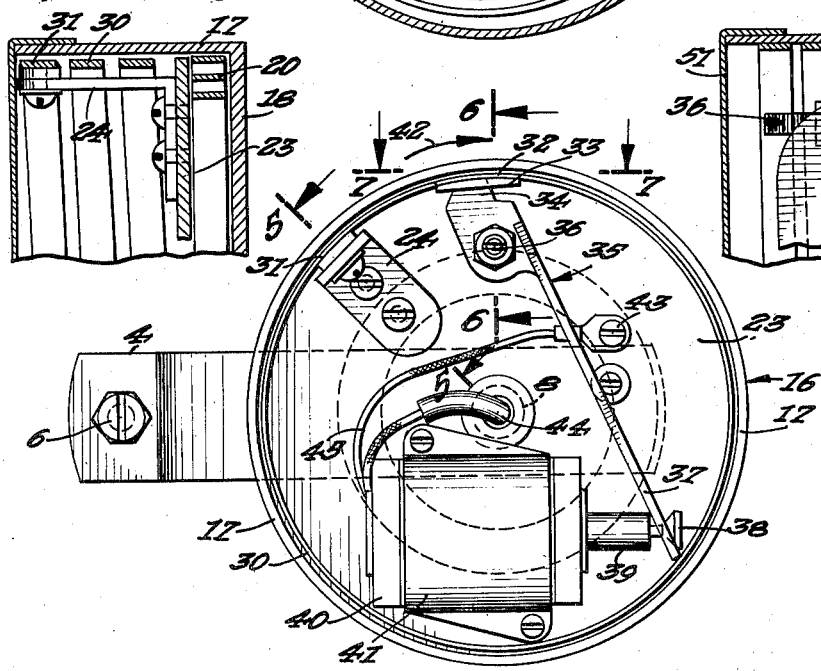
INVENTOR.
Woodbury A. Gindele
BY, Louis Burgess
ATTORNEY.

Patented July 1, 1941

2,247,368

UNITED STATES PATENT OFFICE 2,247,368

BRAKE CONTROL FOR AUTOMOTIVE VEHICLES

Woodbury A. Gindele, New Rochelle, N. Y.

Application June 19, 1940, Serial No. 341,265

5 Claims. (Cl. 188—265)

The device which I have invented is efficient in operation and is further characterized by ruggedness, compactness and ease of installation.

The nature of the invention is a brake lock for automotive vehicles to enable the operator to freeze the braking action by the manual operation of a switch or push button whenever desired. The object of the invention is to provide a device of this nature that is compact, rugged, inexpensively constructed, easily installed, and convenient and efficient in operation.

The invention will be fully understood from the following description read in conjunction with the drawings in which—

Fig. 1 is a vertical section through part of an automobile showing the apparatus installed;

Fig. 1a is a wiring diagram of the electrical circuit involved;

Fig. 2 is a section through the device of my invention on the plane indicated by II—II in Fig. 1;

Fig. 3 is a vertical section through the construction shown in Fig. 2 on the plane indicated by III—III;

Fig. 4 is a vertical section through the construction shown in Fig. 2 on the plane indicated by IV—IV;

Fig. 5 is a radial section through part of the construction shown in Fig. 4 on the plane indicated by V—V;

Fig. 6 is a radial section through part of the construction shown in Fig. 4 on the plane indicated by VI—VI; and Fig. 7 is a section through part of the construction shown in Fig. 4 on the plane indicated by VII—VII.

Referring to Fig. 2 the device 1 is supported by the clamp 2 composed of members 3 and 4 secured to the steering column 5 by bolts 6 and 7. Clamp 2 carries shaft 8 which passes through mating holes in the members 3 and 4 and is rigidly held in position with respect to the clamp by the nuts 10 and 11.

This part of the construction is such that by removing the nut 10 and the bolts 6 and 7 clamp 2 may be separated into its members and then made up in the assembly described, firmly and rigidly attached to the steering column 5 of an automotive vehicle. This step of the installation of the device can be completed within a period of a few minutes and as will be hereinafter clearly developed, the remaining few steps involved in the installation of the device can be similarly completed in correspondingly brief intervals of time.

Referring again to Fig. 2, the shaft 8 carries rotatably mounted, i. e., journaled thereon, the bushing 12 held longitudinally in position by ring 13 and annular projecting flange 14. Bushing 12 carries pulley 15 and this in turn is rigidly attached to drum 16 composed of tubular portion 17 and end member 18. The construction described up to this point is such that drum 16 and pulley 15 are freely rotatable as a unit about shaft 8. This free rotation is, however, prevented by the spiral winding spring 20, one end of which is anchored by screw 21 projecting into ring 13 while the other end is secured by rivet 22 to tubular member 17 of drum 16. Because of winding spring 20 the drum 16 may be turned against the increasing tension of spring 20, but when released will be returned to its original position by the tendency of spring 20 to unwind. The relative arrangement of shaft 8, winding spring 20 and tubular wall 17 appear in end view in Fig. 3. The ring 13 carries anchor plate 23. Plate 23 is secured rigidly in position by pins 19 projecting into collar 13. Within the space defined by plate 23 and the inner surface of member 17 is located a brake band 30 which in this case takes the form of a spirally wound strip of spring metal. The end 31 (Fig. 5) is held in fixed position with respect to plate 23 by bracket 24 secured to plate 23. The other end 32 (Figs. 4, 6 and 7) is provided with a forked abutment 33 which straddles the tooth 34 formed on the end of lever 35. This lever is pivotally mounted on the anchor plate 23 (Fig. 4) by the pin 36. The lower end 37 of the lever 35 straddles the knob 38 provided on the end of armature 39 of solenoid 40. This solenoid is rigidly secured to anchor plate 23 by clamp 41 (Fig. 4). As is evident from this construction when armature 39 of solenoid 40 is in the position shown in Fig. 4, the brake 30, which, as stated, is (in this particular embodiment) a spiral band of spring metal, is not expanded and therefore does not bear against the inner surface of tubular wall 17 of the drum 16. If, however, the solenoid is energized and the armature is withdrawn into the body of solenoid 40, abutment 33 and end 32 of element 30 are urged in the direction indicated by arrow 42 (Fig. 4); the spiral strip of spring metal 30 is expanded and presses firmly against the inner surface of tubular member 17, thereby immobilizing drum 16 with respect to shaft 8.

One terminus of the solenoid coil is grounded to anchor plate 23 at point 43. The other terminus of the solenoid coil is carried through a central duct 44 (Figs. 2 and 4) and the wire 45 (Fig. 2), leading from this end of the solenoid coil is carried to a push button or similar circuit closing means 46 located within easy reach of the driver of the vehicle. Preferably this circuit closing device 46 is in the form of a gear shift knob which may be easily substituted for the gear shift knob originally provided with the car, thereby placing the solenoid control in such a position that it may be actuated by the hand of the driver in contact with the gear shift lever through push button 47. Current is carried to the push button from storage battery 48 with which the car is provided by lead 50. It may be desirable to freeze the brake action while the driver is not using the gear shift lever or for a longer period than would be convenient by this method and for this purpose I provide a switch such as toggle switch 49 in multiple with push button 46 or even as an alternative thereto. This may be mounted on steering column 5 as shown. This switch preferably follows the ignition switch so that the brake control cannot be accidentally left on when the car has been parked. The circuit is diagrammatically shown in Fig. 1a.

Dust and dirt are excluded from the interior of drum 16 and from contact with brake 30 and solenoid 40 by cover 51 secured to drum 16 by screw 52 (Fig. 2).

Pulley 15 (Fig. 2) carries wound thereon flexible cable 53 or similar flexible connector, one end of which is secured to said pulley and the free end of which is secured to elbow 54 of brake foot pedal 55 by yoke 56 and pin 57 (Fig. 1). When the device is installed foot pedal 55 is drilled to receive pin 57. Alternatively, the free end of the cable may be merely carried as a loop around the elbow 54 and secured in position by a clamp. The control device is then placed in appropriate position with respect to steering column 5 by use of clamp 2 as hereinbefore described. The cable 53 is so wound upon pulley 15 that it is unwound simultaneously with the winding up of spring 20 and is conversely wound upon pulley 15 simultaneously with the unwinding of spring 20.

When the device is installed spring 20 is wound, thereby unwinding cable 53 which when so unwound is secured to foot pedal 55, with the foot pedal in the position shown in Fig. 1. In consequence whenever the foot pedal 55 is depressed the tendency of the winding spring 20 to unwind rotates drum 17 and pulley 15, thereby absorbing any slack in cable 53 by winding part of cable 53 upon pulley 15 and keeping cable 53 under a substantially uniform tension. The force of the winding spring 20 is, however, insufficient to overcome the tractive force of spring 58 (Fig. 1) with which foot pedal 55 is provided so that foot pedal 55 is free to return to the position shown in Fig. 1 simultaneously unwinding cable 53 from pulley 15 and winding up spring 20. If, however, whenever the foot pedal 55 has been depressed, push button 47 or any alternative control is operated and the circuit completed, solenoid 40 by expanding the spiral brake 30 immobilizes drum 16 and pulley 15, thereby holding brake pedal 55 in the depressed position and keeping the brake applied.

As is evident from the foregoing the complete installation of the device involves only the setting of shaft 8 and drum 16 in position with respect to steering column 5 as hereinbefore described, suitably connecting cable 53 through yoke 56 to foot pedal 55, the installation of push button control 46 and/or alternative controls if desired and running the necessary electrical connections thereto. The entire installation can be completed in a comparatively short time.

The device is especially advantageous in point of use since whenever in manipulating the vehicle the driver finds it necessary to take his foot from the brake pedal 55, as, for example, to operate the accelerator pedal (not shown) at a time when it is undesirable to release the brakes, he merely operates the electrical control to freeze the braking action during this interval, releasing the control and simultaneously releasing the brakes whenever desired. The driver may in this manner, for example, shift from brake to accelerator when starting on an upgrade without the fear or danger that the vehicle will start rolling backward before the engine can be properly accelerated.

The foregoing description is furnished by way of illustration and not of limitation, and it is, therefore, my intention that the invention be limited only by the appended claims or their equivalents wherein I have attempted to claim broadly all inherent novelty.

I claim:

1. In an automotive vehicle including braking means and a foot pedal controlling said braking means, a shaft, means for securing said shaft in fixed attachment to said automotive vehicle, a drum journaled on said shaft, a winding spring between said drum and said shaft, a pulley carried by said drum, a flexible connector wound upon said pulley and having its free end connected to said foot pedal, a brake adapted when applied to arrest rotation of said drum, magnetic means for applying said brake, an associated circuit, and means for completing said circuit adjacent the driving position.

2. In an automotive vehicle including braking means and a foot pedal controlling said braking means, a shaft, means for securing said shaft in fixed attachment to said automotive vehicle, a drum journaled on said shaft, a winding spring between said drum and said shaft, a pulley carried by said drum, a flexible connector wound upon said pulley and having its free end connected to said foot pedal, a spirally wound brake bearing against said drum adapted when applied to arrest rotation of said drum, magnetic means for applying said brake, an associated circuit, and means for completing said circuit adjacent the driving position.

3. In an automotive vehicle including braking means and a foot pedal controlling said braking means, a shaft, means for securing said shaft in fixed attachment to said automotive vehicle, a drum journaled on said shaft, a winding spring between said drum and said shaft, a pulley carried by said drum, a flexible connector wound upon said pulley and having its free end connected to said foot pedal, a spirally wound brake bearing against the inner surface of said drum adapted when applied to arrest rotation of said drum, magnetic means for applying said brake, an associated circuit and means for completing said circuit adjacent the driving position.

4. In an automotive vehicle including braking means and a foot pedal controlling said braking means, a shaft, means for securing said shaft in fixed attachment to said automotive vehicle, a drum journaled on said shaft, a winding spring between said drum and said shaft, a pulley carried by said drum, a flexible connector wound upon said pulley, and having its free end connected to said foot pedal, a brake bearing against the inner surface of said drum adapted when applied to arrest the rotation of said drum, magnetic means for applying said brake, including a solenoid and a lever between said brake and the armature of said solenoid, an associated circuit and means for completing said circuit adjacent the driving position.

5. In an automotive vehicle including braking means and a foot pedal controlling said braking means, a shaft, means for securing said shaft in fixed attachment to said automotive vehicle, a drum journaled on said shaft, a winding spring between said drum and said shaft, a pulley carried by said drum, a flexible connector wound upon said pulley and having its free end connected to said foot pedal, a spirally wound brake bearing against the inner surface of said drum adapted when applied to arrest the rotation of said drum, magnetic means for applying said brake including a solenoid and a lever between said brake and the armature of said solenoid, an associated circuit and means for completing said circuit adjacent the driving position.

WOODBURY A. GINDELE.